United States Patent
Soh et al.

(10) Patent No.: US 7,333,087 B2
(45) Date of Patent: Feb. 19, 2008

(54) METHOD OF ADJUSTING POINTING POSITION DURING CLICK OPERATION AND 3D INPUT DEVICE USING THE SAME

(75) Inventors: Byung-seok Soh, Suwon-si (KR); Sang-goog Lee, Anyang-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 549 days.

(21) Appl. No.: 11/043,423

(22) Filed: Jan. 27, 2005

(65) Prior Publication Data
US 2005/0174326 A1 Aug. 11, 2005

(30) Foreign Application Priority Data
Jan. 27, 2004 (KR) .................. 10-2004-0004983

(51) Int. Cl.
*G09G 5/00* (2006.01)
*G09G 5/08* (2006.01)
(52) U.S. Cl. ...................... 345/156; 345/158
(58) Field of Classification Search ......... 345/156–167
See application file for complete search history.

(56) References Cited

U.S. PATENT DOCUMENTS

| 5,444,462 A | * | 8/1995 | Wambach | 345/158 |
| 2003/0142065 A1 | * | 7/2003 | Pahlavan | 345/156 |
| 2004/0012564 A1 | * | 1/2004 | Zngf et al. | 345/158 |
| 2005/0179644 A1 | * | 8/2005 | Alsio et al. | 345/156 |

* cited by examiner

*Primary Examiner*—Jimmy H Nguyen
(74) *Attorney, Agent, or Firm*—Sughrue Mion, PLLC

(57) ABSTRACT

A method of adjusting a pointing position on a display during click operation is performed by using a 3D input device including a first unit for detecting movement of a hand and a second unit for detecting movement of a finger, the method including detecting and outputting a hand movement signal by using the first unit, and locating the pointing position on the display based on the hand movement signal; waiting for a click signal generated from the second unit during a second time period if the hand movement signal is not detected during a first time period; and outputting the click signal and preventing the hand movement signal generated from the first unit during the second time period from being output if the click signal is generated during the second time period.

15 Claims, 4 Drawing Sheets

METHOD OF ADJUSTING POINTING POSITION DURING CLICK OPERATION AND 3D INPUT DEVICE USING THE SAME

BACKGROUND OF THE INVENTION

This application claims priority from Korean Patent Application No. 10-2004-0004983, filed on Jan. 27, 2004, in the Korean Intellectual Property Office, the disclosure of which is incorporated herein in its entirety by reference.

FIELD OF THE INVENTION

The present invention relates to a method of adjusting a pointing position during click operation and a three-dimensional (3D) input device using the same, and more particularly, to a method of adjusting a pointing position of a pointer on a display when click operation is performed in a 3D space, and a 3D input device using the same.

DESCRIPTION OF THE RELATED ART

When a user generates a click signal at a certain point on a display by using a 3D input device such as a SCURRY or GYRATION mouse, the click signal can be generated at a position slightly deviated from a desired point due to movement of a hand accompanied by movement of a finger during click operation.

Typically, the 3D input device comprises a gyroscope and an accelerometer for detecting movement of a hand and fingers. The accelerometer is usually mounted on a user's finger to detect an up/down movement of the finger and output a finger movement signal indicating whether a click signal is generated. The gyroscope is usually mounted on the back of the hand to detect movement of the hand and output a hand movement signal.

When a user moves her/his hand to generate a click signal, the back of the hand also moves. Therefore, a hand movement signal is transmitted from the gyroscope before a finger movement signal is transmitted from the accelerometer, thus causing a problem that a click signal is generated at a position deviated from a desired point.

SUMMARY OF THE INVENTION

The present invention provides a method of precisely adjusting a pointing position by disregarding hand movement signals generated before click operation when a user puts on a 3D input device and stops moving her/his hand for the purpose of click operation in a space.

According to an aspect of the present invention, there is provided a method of adjusting a pointing position on a display during click operation is performed by using a 3D input device comprising a first unit for detecting movement of a hand and a second unit for detecting movement of a finger. The method includes detecting and outputting a hand movement signal by using the first unit, and locating the pointing position on the display based on the hand movement signal; waiting for a click signal generated from the second unit during a second time period if the hand movement signal is not detected during a first time period; and outputting the click signal and preventing the hand movement signal generated from the first unit during the second time period from being output if the click signal is generated during the second time period.

According to another aspect of the present invention, there is provided a 3D input device comprising an angular velocity sensor which is put on a part of a hand to detect movement of the hand; accelerometer sensors which are put on a part of fingers to detect movement of the fingers; and a transmitting unit that outputs output signals of the accelerometer sensors and does not output an output signal of the angular velocity sensor during a first time period if an amplitude of the output signal of the angular velocity sensor is smaller than or equal to a first threshold during a second time period, and if the amplitudes of the output signals of the accelerometer sensor are larger than or equal to a second threshold during the first time period.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

Figure 1:
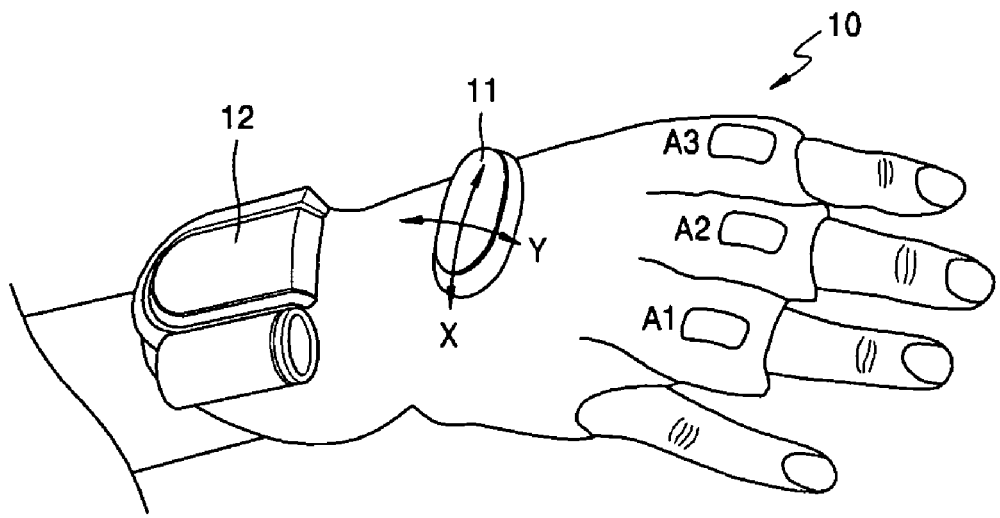
FIG. 1 illustrates an appearance of a 3D input device according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

FIG. 1 illustrates an appearance of a 3D input device according to an exemplary embodiment of the present invention.

Referring to FIG. 1, the 3D input device is put on to a user's hand in the form of a SCURRY mouse like a glove. The reference number 10 refers to accelerometers which are put on fingers. The reference number 11 refers to an angular velocity sensor, namely, a gyroscope which is put on the back of the hand. The reference number 12 refers to a transmitting unit which transmits movement of the fingers or the hand detected by the accelerometers 10 or the gyroscope 11 to an exterior device such as a computer (not shown).

Hereinafter, for convenient description, when an accelerometer 10 is mentioned, the accelerometer will be the one put on the index finger, which is usually used for click operation. The transmitting unit 12 may comprise a signal converting unit (not shown) for converting signals output from the accelerometers 10 ($A_1$, $A_2$, $A_3$) or the gyroscope 11 to be suitable for wireless communication and a control unit (not shown) for performing adjusting a pointing position during click operations in a space according to the present invention.

According to another exemplary embodiment, the transmitting unit 12 may transmit all signals output from the accelerometer 10 or the gyroscope 11 to a receiver unit (not shown). A control unit (not shown) installed in a receiver unit may perform adjusting a pointing position during click operations in a space by using the received signals.

The accelerometer 10 detects up/down movement of the finger for click operation or typing. The gyroscope 11 detects movement of the hand in a right/left direction (X-axis) or an up/down direction (Y-axis) with respect to the wrist. The receiver unit establishes a pointing position of the pointer on a display based on a hand movement signal output from the gyroscope 11.

Figure 2:
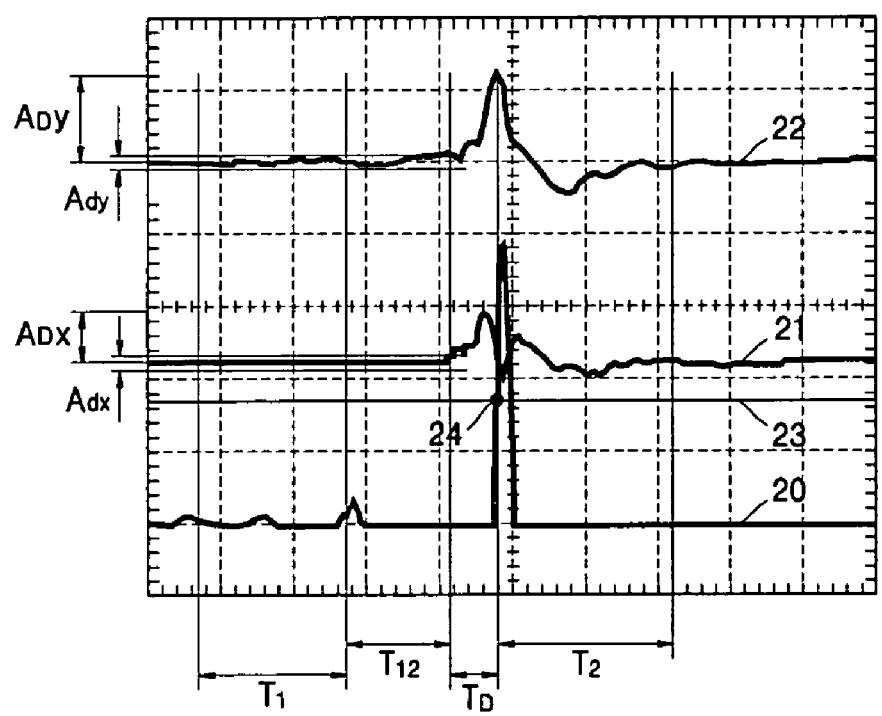
FIG. 2 shows output signals of an accelerometer and a gyroscope during a click operation.

FIG. 2 shows output signals of the accelerometer 10 and the gyroscope 11 during the click operation.

Referring to FIG. 2, the reference number 20 refers to an output signal of the accelerometer 10. The reference number 21 refers to an output signal of the X-axis gyroscope 11 which detects movement in an X-axis direction. The reference number 22 refers to an output signal of the Y-axis gyroscope 11 which detects movement in a Y-axis direction. The reference number 23 refers to a threshold value for determining whether a click signal is generated. The reference number 24 refers to a point where an output value of the accelerometer 10 exceeds the threshold value. At this point, it is regarded that the click operation happens.

In addition, $A_{dx}$ and $A_{dy}$, respectively, are drift ranges generated from each of gyroscopes 11 when the X-axis and Y-axis gyroscopes 11 do not move. $A_{DX}$ and $A_{DY}$ are output ranges of the X-axis and Y-axis gyroscopes 11, respectively, which detect movement of the hand before the click operation is detected. $T_1$ is a time period in which a user temporarily stops movement for click operation. $T_{12}$ is a time period before the outputs of the X-axis and Y-axis gyroscopes 11 exceed $A_{dx}$ and $A_{dy}$ after $T_1$, respectively. $T_{12}$ corresponds to a time margin before the click operation happens after $T_1$. The value of $T_{12}$ may be set to a value not less than 0 as occasion demands. TD is a time period after $T_{12}$ and before the click operation happens. $T_2$ is a time period after detecting the click operation in which detection of movement of the hand is disabled. During the time period $T_2$, the pointer is prevented from moving due to movement of the hand at the moment that the click operation is completed.

As shown in FIG. 2, it can be seen that the X-axis and Y-axis gyroscope 11 detects movement of the hand before a click signal detection point 24. That is, if the hand starts to move for the click operation, the back of the hand on which the gyroscope 11 is put also moves together so that the pointer moves to a position deviated from a desired point on a display.

Therefore, in the exemplary embodiment of the present invention, a click operation is defined to be intentional, if the click operation is generated after a pointer is positioned in a desired point on a display by movement of the hand and then the hand movement stops for a predetermined time period, namely, $T_1$. Click operations except for the above case are regarded as not being intentional. More specifically, when a user stops moving her/his hand, the control unit determines if the user stops to click or stops temporarily during moving the pointer. If it is determined the user stops to click, a hand movement signal generated during a time margin is not allowed to be output so that the movement of the hand is not detected. Here, the time margin refers to a time period that the user is supposed to perform a click operation. If it is determined the user just stops temporarily, click signals generated during a predetermined time period after that are neglected.

Now, this will be described with reference to an attached flowchart.

Figure 3:
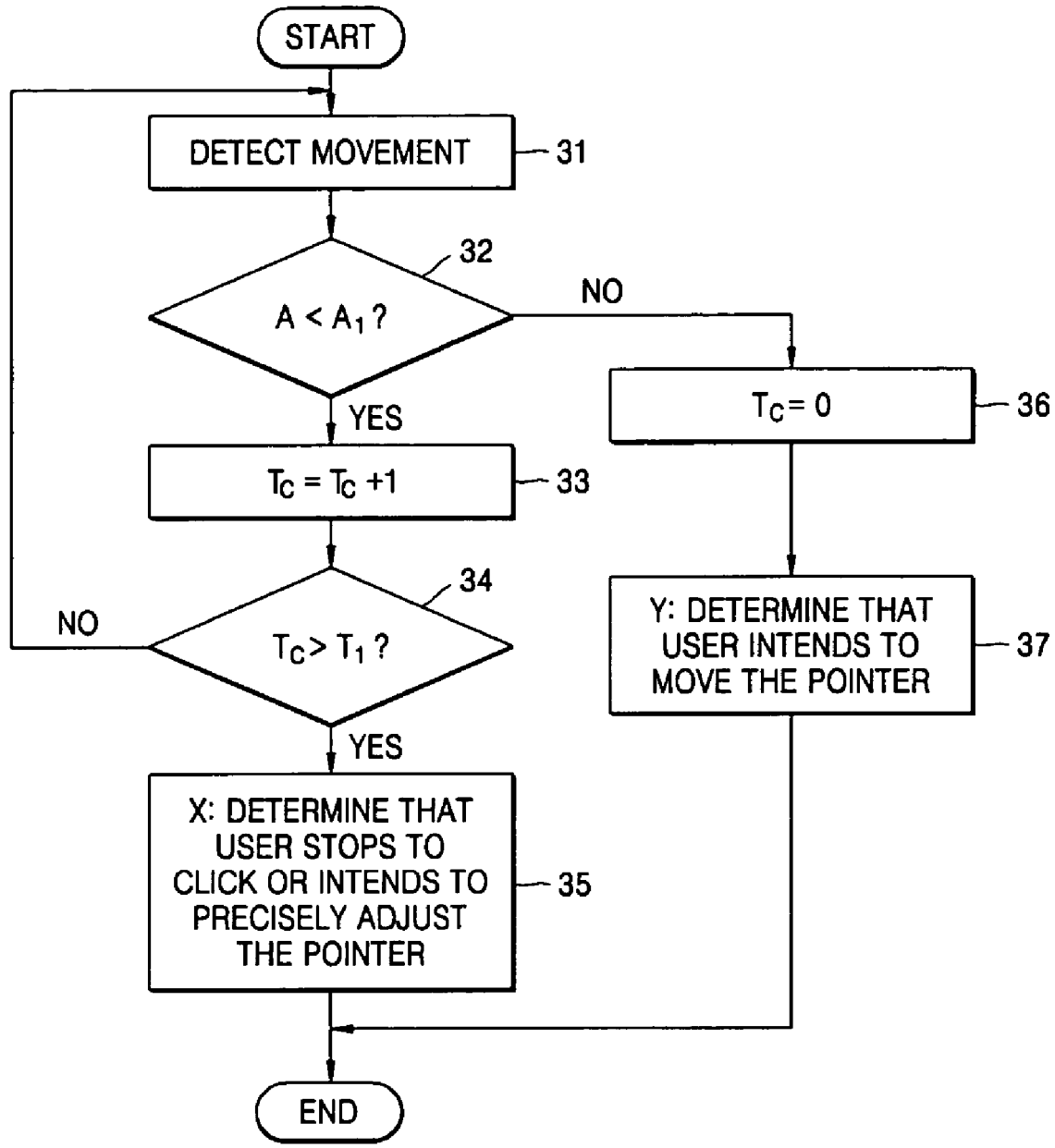
FIG. 3 is a flow chart showing a method of determining user's intention for click operation according to an exemplary embodiment of the present invention.

FIG. 3 is a flowchart showing a method for adjusting a pointing position according to the present invention.

Referring to FIG. 3, first, it is detected if there is any movement by using an output signal of the gyroscope 11 (operation 31). Whether there is movement is determined by measuring an amplitude of an angle velocity. The amplitude of the angle velocity (A) is obtained by summing the square of an amplitude of the angle velocity in an X-axis angular velocity ($A_x$) and the square of an amplitude of a Y-axis angular velocity ($A_y$).

If the measured value A is smaller than a predetermined threshold $A_1$ (operation 32), it is determined that the user temporarily stops moving her/his hand. Therefore, a stop counter $T_c$ is incremented by one sample period (operation 33). If the stop counter $T_c$ is larger than the time period $T_1$ (operation 34), it is determined that the user stops to click or intends to precisely adjust the pointer (a case X, operation 35). In operation 34, if the stop counter $T_c$ is smaller than or equal to the time period $T_1$, the process returns to operation 31.

In operation 32, if the amplitude of the angle velocity A is larger than or equal to the threshold $A_1$, the stop counter $T_c$ is reset to 0 (operation 36), and it is determined that the user intends to move the pointer (a case Y, operation 37).

Figure 4:
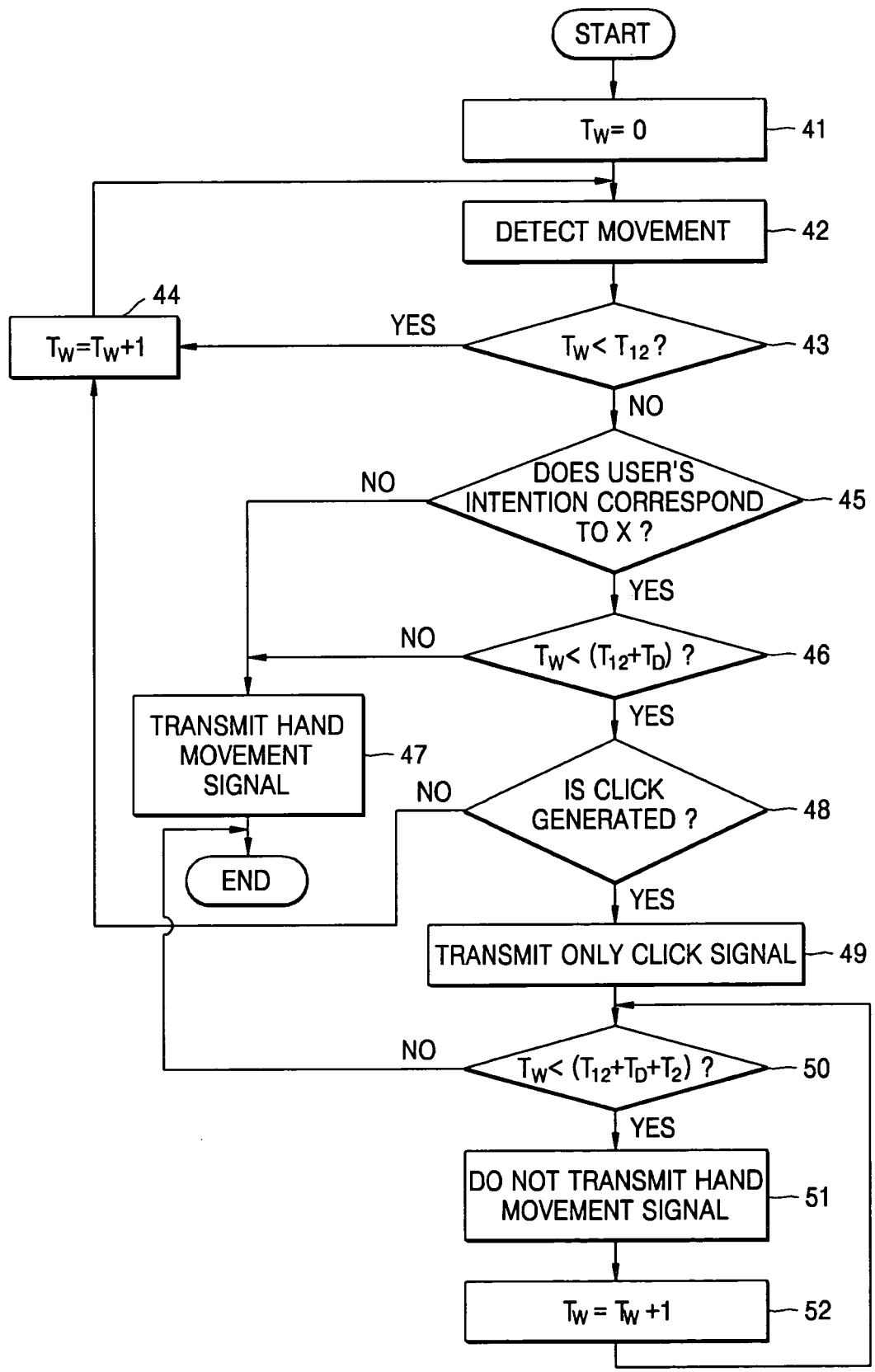
FIG. 4 is a flow chart showing a method of adjusting a pointing position according to an exemplary embodiment of the present invention.

FIG. 4 is a flowchart showing a method of adjusting a pointing position according to the exemplary embodiment of the present invention.

The method of adjusting a pointing position shown in FIG. 4 is performed after the time period $T_1$ shown in FIG. 3. First, a stand-by counter $T_w$ is reset to 0 (operation 41), and it is detected whether there is any movement (operation 42). If the stand-by counter $T_w$ is smaller than the time period $T_{12}$ (operation 43), the stand-by counter $T_w$ is incremented by one sample period (operation 44), and it is detected again whether there is any movement (operation 42). In this case, the time period $T_{12}$ is used as a time margin reserved for the time period $T_1$, and thus can be set to 0 if necessary. If the stand-by counter $T_w$ is larger than or equal to the time period $T_{12}$, then it is determined whether a user's intention corresponds to the case X in operation 35 shown in FIG. 3 (operation 45).

If it is determined that the user intends to click or precisely adjust the pointer (operation 45) and the stand-by counter $T_w$ is smaller than the time period ($T_{12}+T_D$) (operation 46), then operation 48 of waiting for the generation of a click operation is performed. If a click operation is generated, then a click signal is transmitted (operation 49). If a click operation is not generated, then the process returns to operation 42.

If the click operation is generated, while the stand-by counter is smaller than the time period ($T_{12}+T_D+T_2$) (operation 50) the hand movement signal is not transmitted in order to prevent movement of the pointer based on the movement of the hand (operation 51). The stand-by counter $T_w$ is then incremented by one sample period (operation 52) and the process returns to operation 50. The hand movement signal is not transmitted while the stand-by counter $T_w$ is smaller than the time period ($T_{12}+T_D+T_2$).

If it is determined that the user intends to click or precisely adjust the pointer (operation 45), but the stand-by counter $T_w$ is larger than or equal to the time period ($T_{12}$+ $T_D$) (operation 46); then the hand movement signal corresponding to an output signal of the gyroscope 11 is transmitted (operation 447) and the click operation is not generated.

Figure 5:
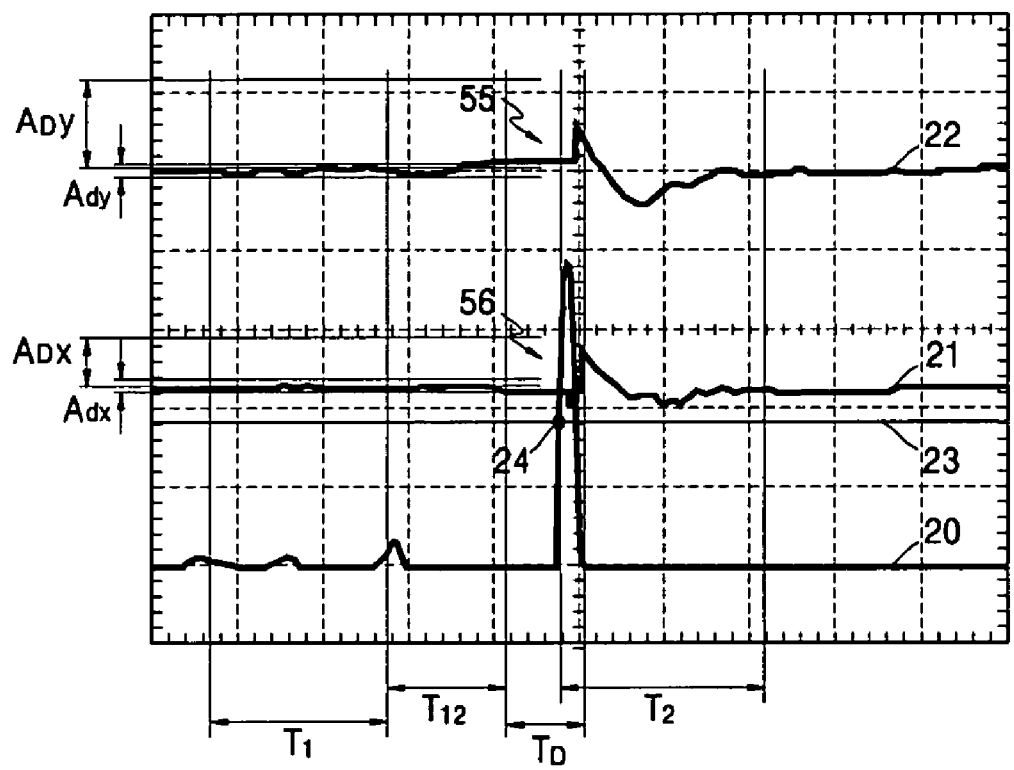
FIG. 5 illustrates output signals of the accelerometer and the gyroscope transmitted from the transmitting unit when a click operation is generated.

FIG. 5 illustrates output signals of the accelerometer and the gyroscope when a click operation is generated.

Referring to the reference numbers 55 and 56 in FIG. 5, it can be seen that the X-axial and Y-axial angle velocity output signals 21, 22 become substantially 0. Therefore, the pointing position is not deviated from the desired point during the click operation.

The following table shows the number of successful clicks when each of five persons (i.e., A, B, C, D and E) clicks 20 times for 4 rounds according to a conventional art.

TABLE 1

| | Number of successful click | | | | |
|---|---|---|---|---|---|
| Round | A | B | C | D | E |
| 1st | 16 | 15 | 15 | 17 | 13 |
| 2nd | 16 | 12 | 18 | 18 | 14 |
| 3rd | 17 | 11 | 12 | 15 | 17 |
| 4th | 14 | 12 | 16 | 18 | 14 |

The following table shows the number of success when each of five persons (i.e., A, B, C, D and E) clicks 20 times for 4 rounds according to the exemplary embodiment of the present invention.

TABLE 2

| | Number of successful click | | | | |
|---|---|---|---|---|---|
| Round | A | B | C | D | E |
| 1st | 18 | 17 | 17 | 19 | 17 |
| 2nd | 20 | 13 | 16 | 19 | 16 |
| 3rd | 17 | 16 | 19 | 20 | 15 |
| 4th | 19 | 16 | 17 | 18 | 17 |

Comparing [Table 1] with [Table 2], the average number of successful click according to a conventional art is 15. On the contrary, the average number according to the present invention is 17.3. This shows that the exemplary embodiment of the present invention results in an improved performance.

Figure 6:
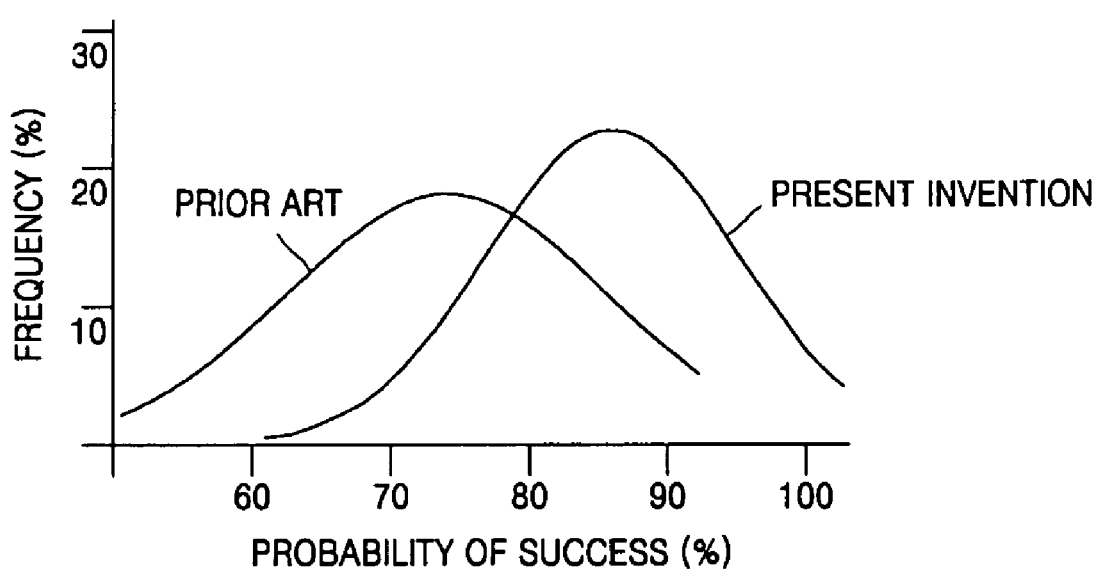
FIG. 6 illustrates frequencies of the number of success over a probability of success of click operation according to a conventional art and an exemplary embodiment of the present invention.

FIG. 6 is a graph showing frequencies of the number of success with respect to a probability of success based on the results shown in the above [Table 1] and [Table 2]. This also shows that the present invention results in an improved performance.

According to the present invention, it is determined if a user stops to click or temporarily stops moving a pointer when a user puts on a 3D input device and stops moving her/his hand. Then, hand movement signals generated before and after the click operation from when a user stops movement are neglected. Therefore, it is possible to more precisely locate a pointing position, and thus improve a probability of click success at a desired point on a display.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of adjusting a pointing position on a display during click operation using a three-dimensional input device comprising a first unit for detecting movement of a hand and a second unit for detecting movement of a finger, the method comprising:

detecting and outputting a hand movement signal by using the first unit, locating the pointing position on the display based on the hand movement signal;

waiting for a click signal generated from the second unit during a second time period if the hand movement signal is not detected during a first time period; and outputting the click signal and preventing the hand movement signal generated from the first unit during the second time period from being output if the click signal is generated during the second time period.

2. The method according to claim 1, wherein whether the hand movement signal is detected depends on whether the amplitude of the hand movement signal is larger than a predetermined threshold value.

3. The method according to claim 1, wherein the click signal is generated if the amplitude of the output signal of the second unit is larger than a second threshold value.

4. The method according to claim 1, wherein the hand movement signal is output without waiting for the click signal if the hand movement signal is detected during the first time period.

5. The method according to claim 1, wherein the click signal is not output if the click signal is generated after the hand movement signal is detected during the first time period.

6. The method according to claim 1, wherein the hand movement signal generated in the first unit during the second time period is output if the click signal is not generated during the second time period.

7. The method according to claim 1, wherein the hand movement signal generated in the first unit during a third time period is not output if the click signal is generated during the second time period.

8. A three-dimensional input device comprising:

an angular velocity sensor capable of being provided on a part of a hand, wherein said angular velocity sensor detects movement of the hand;

at least one accelerometer sensor capable of being provided on a part of a finger, wherein said accelerometer sensor detects movement of the finger; and a transmitting unit configured so that if an amplitude of the output signal of the angular velocity sensor is smaller than or equal to a first threshold during a second time period, and the amplitude of the output signal of the accelerometer sensor is larger than or equal to a second threshold during the second time period; then the transmitting unit outputs the output signal of the accelerometer sensor and does not output the output signal of the angular velocity sensor during a first time period.

9. The 3D input device according to claim 8, wherein the transmitting unit outputs the output signal of the angular velocity sensor and does not output the output signals of the accelerometer sensors if the amplitude of the output signal of the angular velocity sensor is larger than the first threshold during the first time period.

10. The 3D input device according to claim 8, wherein the transmitting unit outputs the output signal of the angular velocity sensor and does not output the output signal of the accelerometer sensor sensors if the amplitudes of the output signal of the accelerometer sensor is smaller than the second threshold value during the second time period.

11. The 3D input device according to claim 8, wherein the transmitting unit does not output the output signal of the angular velocity sensor during a third time period if the amplitude of the output signal of the angular velocity sensor is smaller than or equal to the first threshold during the first time period, and if the amplitudes of the output signals of the accelerometer sensor is larger than or equal to the second threshold during the second time period.

12. The 3D input device according to claim 8, wherein the at least one accelerometer sensors comprises a plurality of accelerometer sensors, each of the plurality of accelerometer sensor capable of being provided on a respective finger of a plurality of fingers of the hand, and each of the accelerometer sensors detects movement of the respective finger.

13. The 3D input device according to claim 12, wherein if the amplitude of the output signal of the angular velocity sensor is larger than the first threshold during the first time period, then the transmitting unit outputs the output signal of the angular velocity sensor and does not output the output signals of the accelerometer sensors.

14. The 3D input device according to claim 12, wherein if the amplitude of the output signal of the accelerometer sensor is smaller than the second threshold value during the second time period, then the transmitting unit outputs the output signal of the angular velocity sensor and does not output the output signals of the accelerometer sensors.

15. The 3D input device according to claim 12, wherein if the amplitude of the output signal of the angular velocity sensor is smaller than or equal to the first threshold during the first time period, and if the amplitude of the output signals of the accelerometer sensors are larger than or equal to the second threshold during the second time period, then the transmitting unit does not output the output signal of the angular velocity sensor during a third time period.

* * * * *